Sept. 17, 1963  A. MALCHAIR  3,103,763
METHOD AND DEVICES FOR HYDROCULTURE AT
PRACTICALLY CONSTANT TEMPERATURE
Filed April 4, 1961  2 Sheets-Sheet 1

INVENTOR
A. Malchair
BY
Richards & Geier
ATTORNEYS

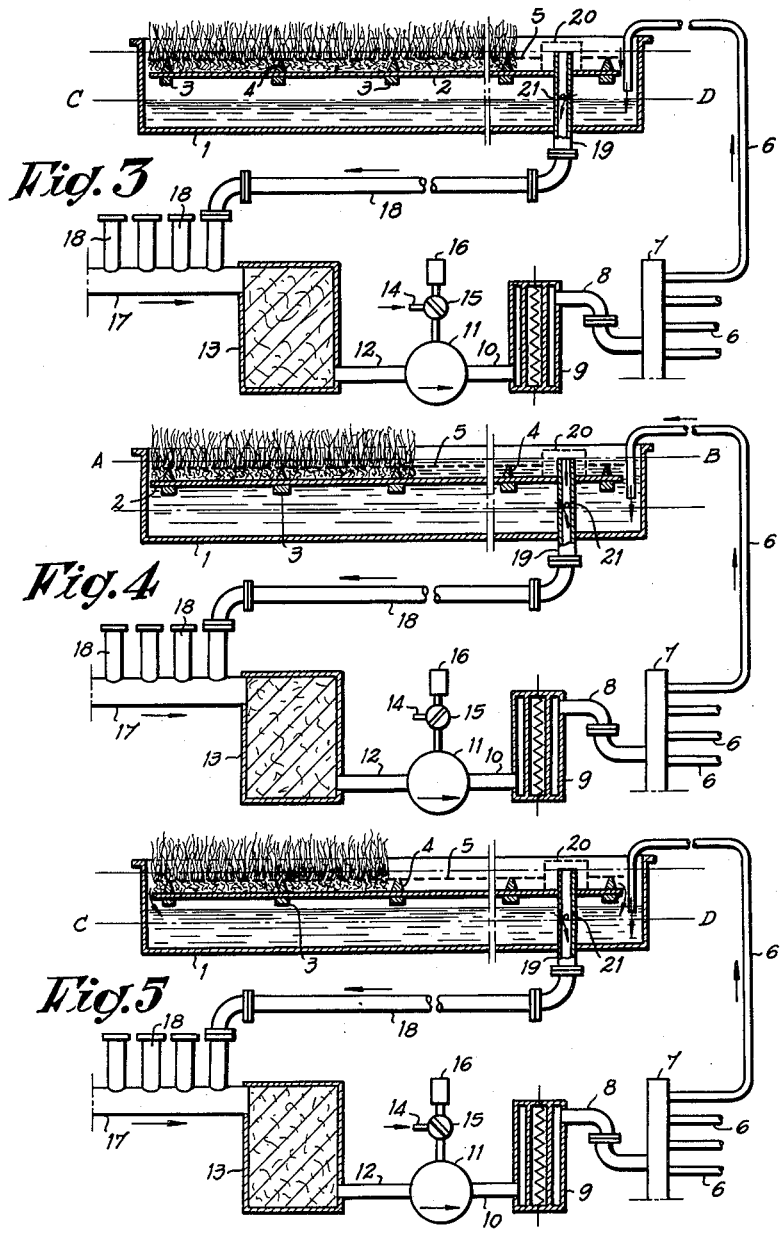

United States Patent Office 3,103,763
Patented Sept. 17, 1963

3,103,763
METHOD AND DEVICES FOR HYDROCULTURE AT PRACTICALLY CONSTANT TEMPERATURE
Armand Malchair, Herstal, Belgium, assignor to Bureau d'Etudes Armand Malchair Societe Anonyme, Liege, Belgium
Filed Apr. 4, 1961, Ser. No. 100,547
Claims priority, application Belgium Apr. 4, 1960
2 Claims. (Cl. 47—1.2)

The present invention concerns the technique of cultivation without soil, called hydroculture.

In this technique, the grains or seeds are generally subjected to one day of soaking and are allowed two days of germination, after which the germinated grains or seeds are spread onto a rigid perforated support and are periodically watered with a nutrient solution; after a few days, the ensuing vegetation is torn off its perforated support. For facilitating this operation, the roots which project on the bottom face of aforesaid rigid support are scraped-off.

It can safely be stated that this technique of hydroculture has now reached a very satisfactory degree of perfection and that the results obtained thereby, namely for the production of fodder, can be considered as being very good indeed.

It is generally acknowledged however that one problem has still to be solved, namely that of heating the ambient surroundings, those well acquainted with the art knowing only too well the failures resulting mainly from sudden changes in the weather conditions. And this problem of a rational heating is, at least to a considerable extent, closely connected to that other problem which concerns the prevention of mildew formation.

The object of the present invention is an original method, as well as the apparatus needed for applying the latter, in view of ensuring a rational and economically sound production independently of varying weather conditions.

On the other hand, aforesaid methods and devices make it practically impossible for mildew or other parasitic elements to develop.

The basic principle underlying this method and these devices is mainly characterized by the fact that, contrary to anything which has been done so far in the realm of hydroculture, the thermal regulation is not effected in the surroundings of the stems or leaves of the plants, but mainly in the immediate vicinity of the grain or seed, and later, of the roots. Applicant has noted in fact that only the roots were particularly vulnerable to sudden changes of temperature, whereas the leaves or stems were able to withstand without damage comparatively important variations of temperature. Following thereupon, one of the essential characteristics of the method and the devices conforming to the present invention is to be found in the thermal regulation, within predetermined lower and upper limits of temperature, of the zone which is located directly under the support of the vegetation.

All these characteristics of the method itself as of the devices applying same, will more clearly come out from a more detailed description given below with reference, by mere way of example and without implying any restrictive sense whatever, to the appended drawings in which:

FIGURES 3, 4 and 5 represent diagrammatically three successive phases of the method conforming to the present invention;

Figure 1:
FIGURE 1 is a diagrammatic view of the general method according to the present invention as well as of the various units of an apparatus by means of which aforesaid method can be applied.
Figure 2:
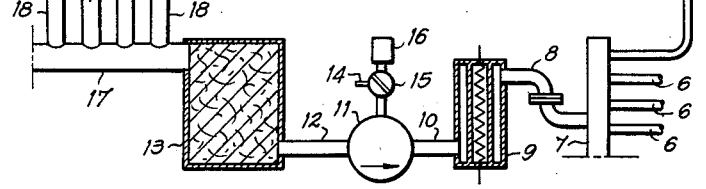
FIGURE 2 is a cross-section of a certain part of the apparatus represented in FIGURE 1.
Figure 6:
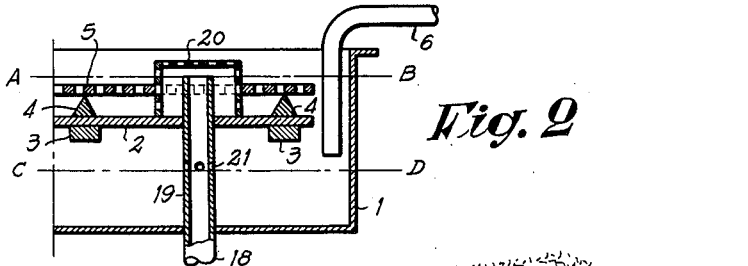
FIGURE 6 is a perspective view of an amount of fodder on its support.
Figure 7:
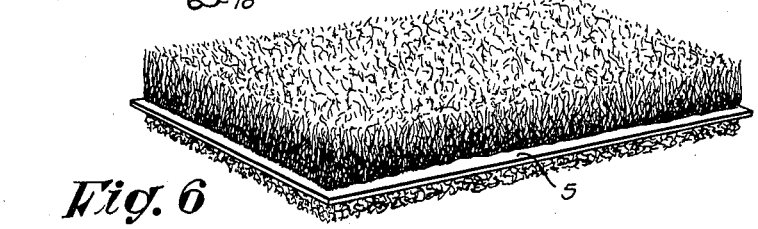
FIGURE 7 is a diagrammatic representation of the phase in which the mass of fodder is separated from its support.

As is shown diagrammatically in FIGURES 1 and 2, an apparatus for applying the method of hydroculture will comprise at least one trough 1, which is shallow but the longitudinal and transverse dimensions of which are, in principle, not limited in any way. At a certain height above its bottom, this trough is provided with a false bottom 2, which is either plain or perforated and supported on ribs 3. On top of aforesaid false bottom, there are other supports 4 on which rests the lattice or perforated sheet 5 which constitutes a temporary support, first for the seeds and later for the vegetation. The false bottom 2 is however optional. One of the tubes 6 connected to a manifold 7 opens into aforesaid trough 1, the mainfold being connected by a tube 8 to a heat exchanger 9. The input of the latter is connected to the outlet of a pump 11 the input of which is connected to a container 13 designed so as to act as a filter. Aforesaid pump 11 comprises an air inlet 14 controlled by a motor driven valve 15. The movements of the latter, as well as the electric circuit of the driving motor (not represented) of pump 11 are controlled by a clockwork 16. A manifold 17, to which all return pipes 18 are connected, opens into the upper part of container 13. The other end of each of these return pipes carries a tubular element 19 penetrating through the bottom and the false bottom 2 of trough 1 and extending upward so as to reach a level A—B which is closed to the upper face of the temporary support 5 onto which the grains or seeds have been spread. The upper open end of aforesaid tubular element 19 is protected by a strainer 20 and the wall of this tubular element has a series of small holes 21 provided at the level C—D reached by the liquid during the heating phase of the operating cycle.

The operating cycle which characterized the method of the present invention takes the following course, as represented diagrammatically in FIGURES 3, 4 and 5: considering that a layer of grains or seeds has been spread onto the temporary support 5, the protection of aforesaid grains or seeds and, later, of the roots and rootlets against dangerous variations of temperature is ensured by putting into circulation a liquid medium, which generally is water to which nutrient substances have been added, through the circuit comprising the filtering container 13, pipe 12, pump 11, pipe 10, to heat exchanger 9, pipe 8, manifold 7, the corresponding pipe 6, that part of trough 1 which is comprised below the level C—D, the openings 21, the tubular element 19, the return pipe 18 and the manifold 17. In order to maintain the regulating liquid at the maximum level C—D in the trough 1, the air inlet 14 is opened to the required extent, which so to say regulates the rate of delivery of the pump. The water-air mixture is forced at reduced rate into the trough 1, whereby the openings 21 of the tubular element 19 act as overflow. The returning liquid is filtered in container 13, whilst the temperature of the water-air mixture can be properly regulated by means of some known form of thermostat or aquastat inserted into the circuit and controlling the switching on and off of the resistance heaters of the heat exchanger 9. Under these circumstances, whatever the ambient temperature may be, the grains or seeds and later, the roots and rootlets will always be maintained at an optimum temperature and will at any rate be protected against all dangerous variations of temperature. For the purpose of saturating periodically aforesaid seeds and later, the roots and rootlets, with the nutrient solution, all that is necessary is to include into the program of the operating cycle, a periodic closing of the motor driven valve 15 so as to close the air inlet 14 of pump 11. The rate at which the latter will be discharging water thereby increases and the level of the liquid medium in trough 1 will rise, considering that the openings 21 provided in the tubular element 19 can not cope with this increased rate of flow. The liquid thus reaches the level A—B.

The excess of liquid medium flows away through the top of the tubular element 19 which thus acts as a constant level device.

Finally, when the seeds have been sufficiently soaked, the motor driven valve 15 is put once more into action through the clockwork device 16 and opens in a duly controlled way the air inlet 14 of the pump. The rate of discharge of the latter will therefore diminish once more; the liquid medium will thus receive below the false bottom 2 until it reaches the level C—D, i.e. the level of the heat regulation phase.

The method and the equipment which have been described above can be applied in many different forms, either in large rooms, or in small rooms, or even in appropriate booths.

It is obvious that the apparatus described above can be supplemented by all kinds of subsidiary equipment of some known type or other for general heating of the rooms, lighting by means of special lamps, handling and subsidiary operations.

It should be noticed that the method and apparatus according to the present invention, can be applied to practically any farming concern and for almost any purpose.

What I claim is:

1. Apparatus for producing hydrocultures comprising at least one trough, a false bottom supported in said trough, a perforated plate supported in said trough above said false bottom, a heat exchanger, means connecting said heat exchanger to said trough, a source of fluid, a pump connected to said heat exchanger whereby said source may be pumped through said heat exchanger and into said trough, an overflow pipe carried in said trough and extending through said false bottom and through and above said perforated plate, said overflow pipe having openings located above said perforated plate and other openings located below said false bottom, means for varying the discharge of said pump whereby the level of the fluid in said trough may be varied between the openings in said overflow pipe, and means connecting said overflow pipe to said pump.

2. A method for producing hydrocultures which comprises providing a perforated supporting surface, spreading seeds on said perforated supporting surface, immersing said supporting surface and said seeds in a solution consisting of water and nutrient substances at predetermined intervals to cause said seeds to grow with the roots thereof penetrating through said perforated plate, and circulating said solution under said perforated supporting surface during intervals when said perforated supporting surface and said seeds are not being immersed to maintain the temperature of said perforated supporting surface and said seeds at a predetermined level.

References Cited in the file of this patent

UNITED STATES PATENTS

| | | |
|---|---|---|
| 1,045,816 | Coy | Dec. 3, 1912 |
| 2,040,161 | Widmann | May 12, 1936 |
| 2,051,094 | Loughridge | Aug. 18, 1936 |
| 2,131,743 | Loughridge | Oct. 4, 1938 |
| 2,750,713 | Chin | June 19, 1956 |
| 2,810,988 | Chin | Oct. 29, 1957 |

FOREIGN PATENTS

| | | |
|---|---|---|
| 473,279 | Great Britain | Oct. 4, 1937 |
| 744,200 | Great Britain | Feb. 1, 1956 |

OTHER REFERENCES

Gettins, E. G.: Secrets of Successful Tank Farming, in Popular Science Monthly, vol. 134, No. 4, pages 144 through 147, April 1939 (Q1. P. 8).

Circular 232, revised, published by Purdue University Agricultural Experiment Station (Lafayette, Indiana), Oct. 1938, entitled "Nutrient Solution Methods of Greenhouse Crop Production," written by Withrow et al., 20 pages in all, only page 5 now relied on.